United States Patent [19]

Chan

[11] Patent Number: 4,831,389

[45] Date of Patent: May 16, 1989

[54] OFF BOARD INK SUPPLY SYSTEM AND PROCESS FOR OPERATING AN INK JET PRINTER

[75] Inventor: C. S. Chan, Boise, Id.

[73] Assignee: Hewlett-Packard Company, Palo Alto, Calif.

[21] Appl. No.: 136,060

[22] Filed: Dec. 21, 1987

[51] Int. Cl.⁴ .............................................. G01D 15/16

[52] U.S. Cl. .............................................. 346/140 R

[58] Field of Search .............................. 346/140, 1.1

[56] References Cited

U.S. PATENT DOCUMENTS

| | | | |
|---|---|---|---|
| 3,747,120 | 7/1973 | Stemme | 346/140 X |
| 4,306,245 | 12/1981 | Kasugayama | 346/140 |
| 4,333,087 | 6/1982 | Yamagoti | 346/140 |
| 4,436,439 | 3/1984 | Koto | 346/140 X |
| 4,490,731 | 12/1984 | Vaught | 346/140 |
| 4,514,743 | 4/1985 | Roschlein | 346/140 |
| 4,630,758 | 12/1986 | Mutoh | 346/140 X |
| 4,689,641 | 8/1987 | Scardovi | 346/140 |
| 4,771,295 | 9/1981 | Baker | 346/1.1 |

*Primary Examiner*—Joseph W. Hartary
*Attorney, Agent, or Firm*—William J. Bethurum

[57] ABSTRACT

A system for supplying ink to an ink jet pen wherein an off board ink supply is provided remote from the pen, and ink is fed from this supply to the pen by capillary action created during an ink jet printing operation. The pen includes a porous storage medium which is initially filled with ink at a slightly negative head. However, this negative head increases during ink depletion from the storage medium and provides the capillary forces necessary to pull ink into the storage medium from the off board ink supply. The driving energy for this action is provided by current drive to a thin film printhead of the pen, thus rendering the printhead multi-functional in purpose and simplifying the ink supply apparatus therefor. The use of an intermediate porous storage medium enables the ink supply system to accommodate large rates of changes in ink demand from the pen while still affording the user with a large ink capacity system in which disposable pens may be readily and easily replaced in a user-friendly operation.

2 Claims, 2 Drawing Sheets

OFF BOARD INK SUPPLY SYSTEM AND PROCESS FOR OPERATING AN INK JET PRINTERTechnical Field This invention relates generally to ink supply systems for ink jet printers and more particularly to such a system which operates in a passive mode without relying upon active pumps or gravitational forces to move ink from an off board supply into an ink jet pen body housing.

BACKGROUND ART AND RELATED APPLICATION

In the field of ink jet printing, it has been one practice to employ disposable pens which are removably mounted in a carriage of an ink jet printer. One such type of pen is disclosed and claimed in copending application Ser. No. 880,774 of Jeffrey Baker et al., filed Jul. 1, 1986, now Pat. No. 4,771,295 assigned to the present assignee and incorporated herein by reference. When the volume of ink within the pen body housing is depleted, the pen is removed from the pen carriage of the printer and replaced with a new one.

In order to extend the useful life of the pen to that of its associated printhead, several approaches have been suggested wherein the ink reservoir within the pen body housing is periodically refilled until such time that some failure mode occurs in the pen. These approaches have included the use of an off board ink supply, meaning that the larger ink supply is positioned at a location remote from the pen and pen carriage assembly of the ink jet printer.

All of these prior art approaches known to me require either some active pumping device or the utilization and mechanical control of gravitational forces (a positive pressure between off board supply and pen body) in order to move the ink from the off board ink supply and into an ink reservoir within the pen body housing. For example, one such active pumping device is disclosed in U.S. Pat. No. 4,368,478 issued to Koto et al. Both of these prior approaches possess certain inherent disadvantages which are related to the provision of either an active pumping device or the utilization of gravitational forces. In contrast thereto, the passive ink supply system according to the present invention overcomes most if not all of these inherent disadvantages of known prior art ink supply systems, and the exact manner in which this is accomplished will become better understood in the following description of the accompanying drawings.

DISCLOSURE OF INVENTION

The general purpose of this invention is to provide a new and improved off board ink supply system and method of operation for an ink jet printer which is passive in nature and requires neither an active pumping device nor a positive pressure in order to transfer ink from an off board ink supply to an on board ink reservoir or cavity within an ink jet pen body. To accomplish this purpose, there is provided herein an on board porous ink storage medium which is initially filled with ink, and then connected by way of an ink flow path to an off board ink supply. With the ink storage medium in the pen body initially filled, there will be an initial negative head (pumping force) in the ink storage medium. However, as the ink in the ink storage medium is consumed during ink jet printing, the negative head in the ink storage medium is increased to thereby pull ink from the off board ink supply and into the ink storage medium by capillary action.

Thus, in accordance with a preferred process embodiment of this invention, there is provided a process for supplying ink to an ink jet pen which includes the steps of: storing ink in a reservoir chamber of a pen body housing, providing a remote source of ink supply, providing an ink flow path between the reservoir chamber and the source of ink supply, increasing the negative head within the reservoir chamber during ink jet printing, and thereby pulling ink from the ink supply and through the ink flow path into the reservoir chamber by the capillary action produced by the increasing negative head within the pen body housing as the ink therein is depleted.

A unique feature and advantage of this invention resides in the fact that the driving energy to the printhead of the ink jet pen during printing also serves to increase the negative head within the ink storage medium. This operation simultaneously provides the negative head necessary to pull ink from the off board supply and into the ink storage medium. Thus, this driving energy serves these two purposes simultaneously, and this latter feature greatly simplifies the apparatus necessary to supply ink into the pen body housing.

Another very significant advantage of this invention resides in the use of a porous material such as the foam disclosed herein as an intermediate storage medium and which does not overly burden the ink delivery system for the pen. Additionally and most importantly, the use of an intermediate foam storage medium in combination with the off board supply enables the system to rapidly meet large swings (rates of changes) in ink demand from each ink storage compartment and still provide the user with a large ink capacity system.

Another advantage of using the foam as an ink reservoir is to minimize the changes in transient negative pressure seen by the printhead, and this in turn stabilizes and improves the printhead performance.

The foam also prevents the sloshing of ink during rapid pen movements and thus serves to stabilize the negative head of the pen. In addition, the foam will act as a bubble trap for the incoming liquid ink, and by properly selecting the foam characteristics, the cover for the pen body housing need not be an air-tight seal, thus providing a definite manufacturing advantage.

The present invention also features the use of a needle/septum device for readily and reliably "docking" the pen with the ink supply system, thus making the pen easily replaceable and user-friendly. The needle has a number of holes therein for uniformly supplying ink to the foam, and the feed tubes into the needle have a scalloped cross-section to thereby maximize the tube's inner surface area and thereby increase its capillary forces.

The above advantages and other novel features of this invention will become better understood in the following description of a preferred embodiment.

DETAILED DESCRIPTION OF THE DRAWING

Figure 1:
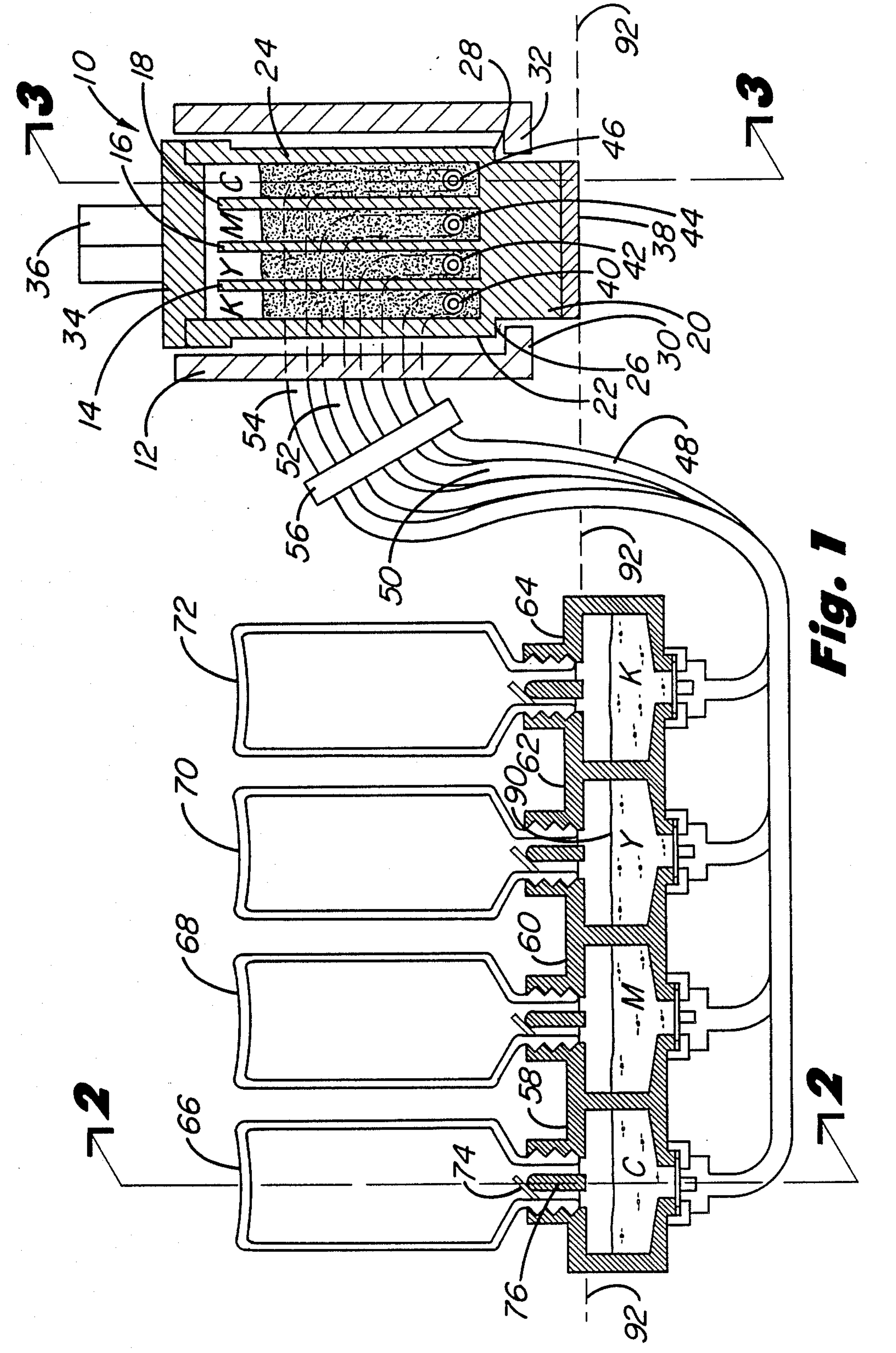
FIG. 1 is a front elevation view, partially in cross section, of the ink supply system according to the invention.

Referring now to FIG. 1, there is shown a pen body housing which is designated generally as 10 and includes an outer housing wall 12 which is similar in construction to the pen body housing described in the above identified Baker et al application. The pen body 10 includes, for example, a four (4) compartment foam storage structure defied by the three (3) partition walls 14, 16 and 18 which extend vertically upward from a bottom wall section 20 and which are surrounded by outer side walls 22 and 24. The outer side walls 22 and 24 include offset flange portions 26 and 28 which rest on the inwardly extending sections 30 and 32 of the mating outer housing wall 12. A top cover plate 34 is received at the top of the outer walls 22 and 24 for providing a top closure for the pen body housing, and an upwardly extending handle 36 is located as shown in the center of the top plate 34. The handle 36 is used to indicate proper pen orientation and to facilitate the loading and unloading of the pen body 10 into a carriage on an ink jet printer (not shown). However, one such printer which is especially well suited to use this type of pen body 10 is disclosed in U.S. application Ser. No. 024,278 of Steven O. Rasmussen et al filed March 11, 1987, assigned to the present assignee and incorporated herein by reference.

The lower wall or support member 20 is adapted to receive a thin film type ink jet printhead 38 on its downwardly facing surface, and this printhead 38 may be of the type disclosed in the above identified Baker et al application and is not therefore described in further detail herein. However, for a further discussion of the fabrication of thermal ink jet printheads of the type suitable for use herein, reference may be made to the *Hewlett-Packard Journal,* Vol. 38, No. 5, May 1985, incorporated herein by reference.

The four (4) ink storage compartments within the pen body housing 10 will typically include the colors yellow, magenta, cyan, and black ink which is simply identified by the letter K in the left hand compartment as shown. Advantageously, the foam in the four compartments will consist of a reticulated polyurethane foam for providing a good porous storage medium for the various colored inks.

Each of the foam storage compartments within the pen body housing 10 is connected respectively by way of a needle 40, 42, 44, 46 located in the lower portion and in back of each of these four compartments to flexible capillary tubes 48, 50, 52 and 54, respectively. These tubes may be connected as shown through a common tube support and spacer member 56 which serves to maintain the four tubes 48, 50, 52 and 54 in place and separated one from another as they extend respectively to the four ink supply sections 58, 60, 62 and 64 within the left hand ink supply (C,M,Y,K) station of FIG. 1. Each of these ink supply sections 58, 60, 62 and 64 in FIG. 1 is adapted to receive a replaceable ink bottle 66, 68, 70 and 72, respectively and each ink bottle is provided with a breakable seal 74 which is opened when brought into contact with a central upstanding member 76 of each supply section 58. When the seal 74 is broken, the ink in the bottle 66, for example, in section 58 will fill up with cyan colored ink, and similar action will occur for the other colors (and black and/or clear) in the other supply sections 58, 60, 62 and 64 as indicated.

Figure 2:
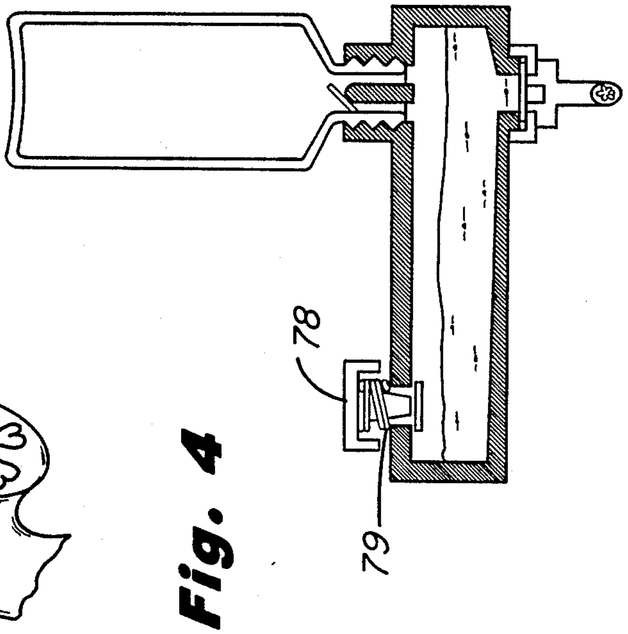
FIG. 2 is a side elevation view of one of the off board ink reservoirs and replaceable ink bottles in FIG. 1.

To facilitate this ink filling operation, a prime and vent mechanism 78 which is biased open with a coil spring 79 is included as shown in FIG. 2 to provide an air pressure release in each of the ink supply sections and to enable air to escape from the various sections, e.g. 58 during an ink filling operation.

Figure 3:
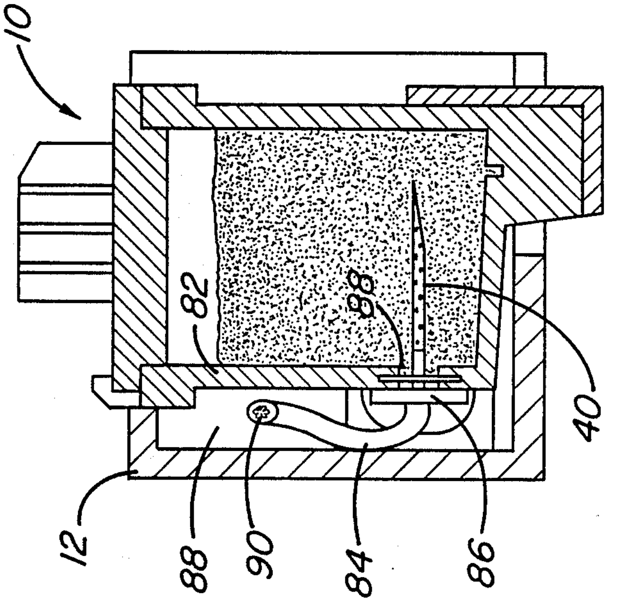
FIG. 3 is a side elevation view of the ink jet pen body housing taken vertically through one of the foam storage sections of the pen body housing on the right hand side of FIG. 1.

Referring now to FIG. 3, there is shown in greater detail the exact nature of the insertion of the needle 40 into the foam storage compartment. This detail is indicated in cross sectional view in this figure. The needle 40 extends through an opening 80 in the wall 82 of the housing 10, and it includes an upstanding feed portion 84 which is located as shown in the sidewall compartment between the outer housing wall 12 and one of the inner compartment walls 82. The needle 40 is further provided with a flexible (e.g. rubber) sealing ring or septum 86 which abuts directly against the opening 88 to prevent any leakage of the ink from the foam and into the outer sidewall compartment 88. The upstanding portion 84 of the needle 40 has a serrated or scalloped opening 89 therein for passing ink down through the tube 84 and through the needle portion 40 and into the foam storage compartment as indicated. The needle portion 40 has a number of spaced holes therein for uniformly distributing the ink to the foam in a given compartment.

Figure 4:
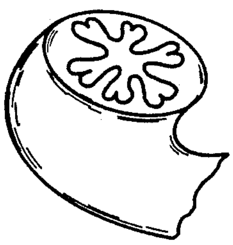
FIG. 4 is an enlarged view of the scalloped cross-section of the individual ink feed tubes from the off-board supply to the needles extending into the foam.

The scalloped cross section of opening 89 in the upstanding portion 84 of the needle matches the scalloped inner surface cross section of the mating ink feed tubes, e.g. 48, as seen in the enlarged view in FIG. 4. This geometry increases and maximizes the inner surface areas of these components and thereby increases their capillarity.

The upstanding portion 84 of the needle may be easily rotated into and out of the enclosed compartment 88 and rapidly withdrawn from a foam compartment of a used pen and then inserted into a like compartment of a new pen. Thus, this needle/septum mounting and insertion assembly adjacent each foam compartment makes the off board ink supply system user friendly and readily adaptable for use with various types of foam filled disposable ink jet pens.

The upper free surface ink line, e.g. 90, in each of the supply sections 58, 60, 62 & 64 is below the horizontal level of the ink jet printhead 38, thereby preventing any syphoning off of the ink from the foam storage compartments. Thus, when the various ink storage compartments of the pen body 10 are initially filled with ink, there will be a small negative fluid pressure differential between the ink in these supply sections 58, 60, 62 and 64 and the bottom wall 20 of the various compartments in the pen body housing 10. However, when the ink jet printhead 38 is operational, the pumping action of the printhead 38 induces a negative pressure in the foam which will then pump the ink from the ink supply sections 58, 60, 62 and 64 and through their associated capillary tubes 50, 52, 54 and 56.

As the ink is removed from these four foam storage compartments and out of the ink jet printhead 38 during an ink jet printing operation, the negative head in each of these four compartments will increase and will produce, by capillary action, a pulling of the fluid from the supply vessels 58, 60, 62 and 64 and through the various tubes 54, 52, 50 and 48, respectively, and into the four compartments of the housing 10. This action will continue until such time that the ink level in each of these four foam storage compartments is brought back up to a level such that the negative pressure at the printhead 38 is less than the static head difference between the printhead 38 and the liquid level 90 in each of the reservoirs.

Various modifications may be made in the above described embodiment without departing from the scope of this invention. For example, many structural modifications may be made to the mechanical apparatus aspects of this embodiment to render it more compatible with various different types of ink jet printers and different types of pen carriage assemblies. In addition, additional foam storage compartments and additional off board ink supply stations may be added to the above embodiment to accommodate other colors of ink as well as both black ink and clear vehicle. And, the foam storage compartments may be connected to other types of printheads (e.g. piezoelectric) and are not restricted to use with thermal ink jet printheads.

I claim:

1. In combination, a multicolor ink jet pen including a pen body with separate foam storage compartments therein for storing different colors of ink and a detachable remote ink supply operative for easy connection to said pen body and without requiring an air tight seal at the point of connection of ink into said pen body, characterized in that said remote ink supply has a plurality of ink containers positioned to carry a free liquid surface beneath an ink ejection output plane of said pen; a plurality of ink feed lines leading from said containers in said remote ink supply and into separate compartments respectively in said pen body; and connection means at ends of said ink feed lines operative to facilitate the rapid individual and independent connection and removal of each of said ink feed lines from each of said compartments within said pen body, whereby ink demands on each of said compartments may be accommodated independently of other adjacent compartments.

2. The pen and ink supply combination defined in claim 1 wherein said connection means includes a needle secured to the ends of each of said ink feed lines and adapted for insertion into openings to said compartments of said pen body and operative for easy penetration into and removal from foam within each of said compartments.

* * * * *